Patented Oct. 18, 1949

2,485,237

UNITED STATES PATENT OFFICE 2,485,237

SYNTHESIS OF AROMATIC ALDEHYDES

William F. Gresham and Georges E. Tabet, Wilmington, Del., assignors to E. I. du Pont de Nemours & Company, Wilmington, Del., a corporation of Delaware No Drawing. Application August 24, 1946, Serial No. 692,936

14 Claims. (Cl. 260—599)

This invention relates to the synthesis of aromatic aldehydes and more particularly to a method for the preparation of aromatic aldehydes by reaction between aromatic hydrocarbons and carbon monoxide in the presence of a mixed hydrogen fluoride-boron trifluoride catalyst.

It has been disclosed heretofore (U. S. Patent 2,135,447) that aromatic aldehydes such as benzaldehyde can be prepared by reaction between aromatic hydrocarbons and carbon monoxide in the presence of volatile halides such as hydrogen chloride, hydrogen fluoride, boron fluoride, etc. This process for the preparation of aromatic aldehydes, however, has not been commercially attractive because of the very low yields obtained and also because of the tarry nature of the reaction product which made it very difficult to separate pure aromatic aldehyde therefrom.

It has also been known for many years that carbon monoxide can react with benzene in the presence of aluminum chloride to give benzaldehyde which, however, could be obtained only in quantities equivalent to the amount of aluminum chloride catalyst employed. This process employing aluminum chloride also has been disadvantageous because of the difficulty of separating or recovering aluminum chloride from the reaction mixture thereby obtained.

An object of this invention is to provide a process for the preparation of aromatic aldehydes from aromatic hydrocarbons and carbon monoxide in high yield, and under such conditions that the catalyst can be readily recovered or separated from the aromatic aldehyde in the reaction product. Other objects of the invention will appear hereinafter.

The objects of the invention are accomplished by subjecting a mixture of aromatic hydrocarbon and carbon monoxide to the action of a mixed hydrogen fluoride-boron trifluoride catalyst at a temperature of about −80° C. to +50° C., preferably −50° to +20° C., under superatmospheric pressure, whereby a reaction product containing aromatic aldehyde is obtained. This reaction product can be separated into its constituents without difficulty, and both the aromatic aldehyde and the recovered catalyst are readily obtainable therefrom. Since the catalyst can be recovered and reused, it is generally preferred to employ a sufficiently large quantity thereof so that the reaction may take place at the maximum convenient reaction rate. For optimum results this usually requires about 0.5 to 1.5 mols of boron fluoride per mol of aromatic hydrocarbon and an approximately equivalent amount of hydrogen fluoride. In a specific embodiment the invention contemplates the synthesis of p-tolualdehyde by subjecting a mixture of toluene and carbon monoxide to the action of a catalyst containing about 0.5 to 1.5 mols of boron fluoride per mol of hydrogen fluoride at a temperature of −80° to +50° C. under superatmospheric pressure.

One of the surprising features of the present invention is the discovery that at very low temperatures the reaction between carbon monoxide and the aromatic hydrocarbon is very rapid even at pressures which may be as low as about 10 atmospheres. Higher pressures, i. e. pressures up to or greater than about 1000 atmospheres may be employed if desired. In the synthesis of p-tolualdehyde, according to the invention, a pressure of about 30 atmospheres is sufficiently high for excellent yields. The advantages of the invention are realized, however, when the temperature is maintained within a range considerably lower than has heretofore been employed in processes for the reaction between carbon monoxide and aromatic hydrocarbons in the presence of either boron trifluoride or hydrogen fluoride catalysts. At the low temperatures employed in the practice of the invention neither boron trifluoride nor hydrogen fluoride, when employed alone as catalysts, is effective for the synthesis of aromatic aldehydes from aromatic hydrocarbons and carbon monoxide in any substantial yield.

The hydrocarbons which may be employed in the practice of the invention include the monocyclic and polycyclic aromatic hydrocarbons such as benzene, naphthalene, phenanthrene, diphenyl, diaryl methanes, alkyl-substituted aromatic hydrocarbons, such as toluene, ethyl benzenes, propyl benzenes, butyl benzenes, hexyl benzenes, etc.

It is generally preferred in the practice of the invention to employ a mixed hydrogen fluoride-boron trifluoride catalyst which contains approximately equimolal quantities of hydrogen fluoride and boron trifluoride. However, it is by no means essential that the catalyst contain equivalent quantities of the said constituents, it being sufficient if both constituents are present, even though one is present in relatively minor quantity. The invention is illustrated further by means of the following examples:

*Example 1.*—A mixture containing 0.75 mol of toluene, 0.75 mol of hydrogen fluoride and 0.75 mol of boron trifluoride was cooled in a pressure-resisting vessel at a temperature of −32° to −12° C. for about 24 minutes with carbon monoxide at a pressure of about 210 to 540 pounds per square inch. A 40.6% conversion to p-tolualdehyde (yield, 80%) was obtained. The p-tolualdehyde was isolated by distillation after removing the catalyst with several water washes.

*Example 2.*—A mixture containing two mols of toluene, one mol of hydrogen fluoride and one mol of boron trifluoride was processed under the conditions set forth in Example 1. The conversion to p-tolualdehyde was 28.5% based on the amount of toluene initially present.

*Example 3.*—A mixture containing 0.5 mol of toluene, 0.75 mol of hydrogen fluoride and 0.75 mol of boron trifluoride was maintained at a temperature of −18° to +2° C. for 13 minutes under a carbon monoxide pressure of 75 to 710 atmospheres. The conversion of toluene to p-tolualdehyde was 80.5% based on the amount of toluene not reacted, and the yield was 92% of the theoretical. The p-tolualdehyde was isolated by distilling the reaction product after removal of catalyst by water wash.

*Example 4.*—The following table summarizes the data obtained in several experiments in which aromatic hydrocarbons were treated with carbon monoxide in the presence of HF·BF$_3$ catalyst.

Table—Synthesis of aromatic aldehydes

| Aromatic Hydrocarbon | Mols of Hydrocarbon | Mols of HF·BF$_3$ | Temp., °C. | Time, Min. | Press. (atm.) | Product | Per cent Conv. |
|---|---|---|---|---|---|---|---|
| benzene | 1 | 0.75 | 25–28 | 26 | 120–710 | benzaldehyde | 16.8 |
| Do | 0.5 | 1.0 | −21 to −7 | 13 | 60–725 | do | 19 |
| m-xylene | 0.5 | 1.0 | 28–40 | 32 | 75–725 | 2,4-dimethylbenzaldehyde | 65.4 |
| Do | 0.5 | 1.0 | −38 to −14 | 13 | 96–725 | do | 80.5 |
| p-xylene | 0.5 | 1.0 | −10 to +6 | 22 | 70–720 | 2,5-dimethylbenzaldehyde | 70 |
| mesitylene | 0.3 | 1.0 | 26 to 35 | 11 | 100–730 | 2,4,6-trimethylbenzaldehyde | 82.3 |
| diphenyl | [1] 0.25 | 1.0 | −30 to −18 | 10 | 125–725 | p-phenylbenzaldehyde | 82.5 |
| naphthalene | [1] 0.5 | 1.0 | −30 to +20 | 10 | 75–725 | α-naphthaldehyde | 73.8 |

[1] cyclopentane diluent.

It is to be understood that any suitable method may be employed for separating the aromatic aldehyde from the mixed catalyst and the other constituents of the crude reaction product. One method which gives satisfactory results is to treat the crude reaction product with a metal halide, whereby the organic constituent is set free and a complex is formed between the metal halide and the inorganic catalyst (cf. U. S. Patent 2,135,458). Another suitable method is to neutralize the catalyst while maintaining the mixture at sufficiently low temperature to avoid undesirable condensation reactions, and thereafter to recover the hydrogen fluoride and boron trifluoride by treating the fluoborate salt thus obtained with sulfuric acid. If desired, the reaction product may be treated with an amount of anhydrous ammonia equivalent to the hydrogen fluoride and boron trifluoride present, whereby a mixture containing ammonium fluoborate, which may be admixed with ammonium fluoride, is obtained. Hydrogen fluoride and boron trifluoride may be recovered from these ammonium salts by treatment with sulfuric acid. A preferred method for recovery of the catalyst from the crude reaction product is to treat the said product with an alkali metal or alkaline earth metal fluoride such as sodium fluoride, lithium fluoride, or calcium fluoride. In this manner the catalyst is very readily separated from the aldehyde, and the aldehyde may thereafter be purified by suitable methods such as low-pressure distillation if desired.

The aldehydes obtained in accordance with this invention are widely useful per se or may be converted by oxidation to the corresponding dicarboxylic acids; for example, p-tolualdehyde is an excellent source for terephthalic acid which in turn is widely useful in the manufacture of various resinous materials such as the polyesters.

Since many different embodiments may be made without departing from the spirit and scope thereof, it is to be understood that we do not limit ourselves except as set forth in the following claims.

We claim:

1. The process for the synthesis of aromatic aldehydes which comprises subjecting a mixture of aromatic hydrocarbon and carbon monoxide to the action of a mixed anhydrous hydrogen fluoride-boron trifluoride catalyst at a temperature of about −80° C. to +50° C. under superatmospheric pressure, and thereafter separating the aromatic aldehyde thus produced from the resulting mixture.

2. A process for the synthesis of aromatic aldehydes which comprises subjecting a mixture of aromatic hydrocarbon and carbon monoxide to the action of a mixed anhydrous hydrogen fluoride-boron trifluoride catalyst at a temperature of about −80° C. to +50° C. under a pressure of about 10 to 1000 atmospheres and thereafter separating the aromatic aldehyde produced by the resulting reaction from the ensuing reaction product.

3. A process for the synthesis of aromatic aldehydes which comprises subjecting a mixture of aromatic hydrocarbon and carbon monoxide to the action of a catalyst consisting of about equimolal quantities of hydrogen fluoride and boron trifluoride at a temperature of about −80° C. to +50° C. under superatmospheric pressure and thereafter separating from the resulting mixture the aromatic aldehyde produced by the ensuing reaction.

4. A process for the synthesis of p-tolualdehyde which comprises subjecting a mixture of toluene and carbon monoxide to the action of a catalyst consisting solely of hydrogen fluoride and boron trifluoride at a temperature of about −80° C. to +50° C. under superatmospheric pressure and thereafter separating p-tolualdehyde from the resulting mixture.

5. A process for the synthesis of p-tolualdehyde which comprises subjecting a mixture of toluene and carbon monoxide to the action of a catalyst consisting solely of hydrogen fluoride and boron trifluoride at a temperature of about −80° C. to +50° C. under a pressure of about 10 to 1000 atmospheres and thereafter separating p-tolualdehyde from the resulting mixture.

6. A process for the synthesis of p-tolualdehyde which comprises subjecting a mixture of toluene and carbon monoxide to the action of a catalyst consisting of about equimolal quantities of hydrogen fluoride and boron trifluoride at a temperature of about −80° C. to +50° C. under superatmospheric pressure and thereafter separating p-tolualdehyde from the resulting mixture.

7. The process for the synthesis of p-tolualdehyde which comprises subjecting about 0.5 mol of toluene, 0.75 mol of hydrogen fluoride and 0.75 mol of boron trifluoride to a temperature of about −18° to +2° C. under a pressure of about 75 to 710 atmospheres and thereafter separating p-tolualdehyde from the resulting mixture.

8. A process for the synthesis of benzaldehyde which comprises subjecting a mixture of benzene and carbon monoxide to the action of a catalyst consisting solely of hydrogen fluoride and boron trifluoride at a temperature of about −80° C. to +50° C. under superatmospheric pressure and thereafter separating benzaldehyde from the resulting mixture.

9. A process for the synthesis of benzaldehyde which comprises subjecting benzene and carbon monoxide to the action of a catalyst consisting solely of hydrogen fluoride and boron trifluoride at a temperature of about −80° C. to +50° C. under a pressure of about 10 to 1000 atmospheres and thereafter separating benzaldehyde from the resulting mixture.

10. A process for the synthesis of benzaldehyde which comprises subjecting a mixture of benzene and carbon monoxide to the action of a catalyst consisting of about equimolal quantities of hydrogen fluoride and boron trifluoride at a temperature of about −50° to +20° C. under superatmospheric pressure and thereafter separating benzaldehyde from the resulting mixture.

11. A process for the synthesis of alpha-naphthaldehyde which comprises subjecting a mixture of naphthalene and carbon monoxide to the action of a catalyst consisting solely of hydrogen fluoride and boron trifluoride at a temperature of about −50° to +20° C. under superatmospheric pressure and thereafter separating alpha-naphthaldehyde from the resulting mixture.

12. A process for the synthesis of alpha-naphthaldehyde which comprises subjecting a mixture of naphthalene and carbon monoxide to the action of a catalyst consisting solely of hydrogen fluoride and boron trifluoride at a temperature of about −50° to +20° C. under a pressure of about 10 to 1000 atmospheres and thereafter separating alpha-naphthaldehyde from the resulting mixture.

13. A process for the synthesis of alpha-naphthaldehyde which comprises subjecting a mixture of naphthalene and carbon monoxide to reaction of a catalyst consisting of about equimolal quantities of hydrogen fluoride and boron trifluoride at a temperature of about −50° to +20° C. under superatmospheric pressure and thereafter separating alpha-naphthaldehyde from the resulting mixture.

14. A process for the synthesis of p-tolualdehyde which comprises reacting carbon monoxide with toluene at a temperature of about −50° to +20° C. under a pressure of about 30 atmospheres in the presence of a mixed catalyst consisting of hydrogen fluoride and boron fluoride, said catalyst containing about 0.5 to 1.5 mols of $BF_3$ per mol of HF, and thereafter separating p-tolualdehyde from the resulting mixture.

WILLIAM F. GRESHAM.
GEORGES E. TABET.

REFERENCES CITED

The following references are of record in the file of this patent:

UNITED STATES PATENTS

| Number | Name | Date |
|---|---|---|
| 1,885,060 | Hoffman et al. | Oct. 25, 1932 |
| 1,933,434 | Hoffman et al. | Oct. 31, 1933 |
| 2,158,031 | Loder | May 9, 1939 |
| 2,447,565 | Chenicek | Aug. 24, 1948 |

OTHER REFERENCES

Catalysis, 1940, pages 344–345, 2 pages, Berkman et al.

Jacobson: "Encyclopedia of Chemical Reactions," Reinhold Pub. Corp. (1946), citing at page 667, Sowa et al., Jour. Am. Chem. Soc., 57, 454 (1935), and Davy, New Edin. Phil. J., 17, 246 (1812).